United States Patent
Mizutani et al.

(10) Patent No.: US 12,539,935 B2
(45) Date of Patent: Feb. 3, 2026

(54) OPERATING DEVICE FOR HUMAN-POWERED VEHICLE

(71) Applicant: SHIMANO INC., Sakai (JP)

(72) Inventors: Hayata Mizutani, Sakai (JP); Takuma Sakai, Sakai (JP); Shun Kakehashi, Sakai (JP); Yuichiro Hidaka, Sakai (JP); Hiroshi Matsumoto, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 19/019,462

(22) Filed: Jan. 14, 2025

(65) Prior Publication Data

US 2025/0153799 A1    May 15, 2025

Related U.S. Application Data

(63) Continuation of application No. 17/680,346, filed on Feb. 25, 2022, now Pat. No. 12,227,259.

(51) Int. Cl.
*B62K 21/14* (2006.01)
*B62K 23/06* (2006.01)

(52) U.S. Cl.
CPC .............. *B62K 21/14* (2013.01); *B62K 23/06* (2013.01)

(58) Field of Classification Search
CPC ................................ B62K 21/14; B62K 23/06
See application file for complete search history.

(56) References Cited

U.S. PATENT DOCUMENTS

| | | | |
|---|---|---|---|
| 5,159,851 A | 11/1992 | Rahmes | |
| 6,073,730 A | 6/2000 | Abe | |
| D612,223 S | 3/2010 | DePretto | |
| 9,027,433 B2 * | 5/2015 | Dal Pra' | G05G 1/06 74/502.2 |
| 10,071,787 B2 | 9/2018 | Matsueda et al. | |
| 10,745,077 B2 | 8/2020 | Goto et al. | |
| 10,994,798 B2 * | 5/2021 | Mizutani | B62K 23/06 |
| 11,370,505 B2 | 6/2022 | Kakehashi et al. | |

(Continued)

FOREIGN PATENT DOCUMENTS

| | | |
|---|---|---|
| DE | 102017218055 | 4/2019 |
| DE | 102019130398 | 5/2021 |
| EP | 2100805 | 9/2009 |

OTHER PUBLICATIONS

Office Action with Form PTO-892 Notice of References Cited issued by the U.S. Patent and Trademark Office for the U.S. Appl. No. 17/680,346, Sep. 25, 2023.

(Continued)

*Primary Examiner* — Thomas C Diaz
(74) *Attorney, Agent, or Firm* — MORI & WARD, LLP

(57) ABSTRACT

An operating device includes a base and an operating member. The operating member is pivotally coupled to the base about a pivot axis. The base includes a base body and a cover. The cover includes a cover body and a buffering part. The cover body includes an upper outer surface, a first lateral outer surface, a second lateral outer surface, a first shoulder, and a second shoulder. The first shoulder is provided between the upper outer surface and the first lateral outer surface. The second shoulder is provided between the upper outer surface and the second lateral outer surface. The buffering part is in contact with the base body when the cover is deformed by force applied from a user's hand.

16 Claims, 11 Drawing Sheets

(56) References Cited

U.S. PATENT DOCUMENTS

| | | |
|---|---|---|
| 11,745,824 B2 | 9/2023 | Swanson et al. |
| 2005/0126331 A1* | 6/2005 | Dal Pra .................... B62L 3/02 |
| | | 74/558.5 |
| 2020/0070928 A1 | 3/2020 | Kakehashi et al. |
| 2020/0070929 A1 | 3/2020 | Mizutani et al. |
| 2023/0242215 A1* | 8/2023 | Chang ...................... B62L 3/02 |
| | | 280/288.4 |

OTHER PUBLICATIONS

Office Action with Form PTO-892 Notice of References Cited issued by the U.S. Patent and Trademark Office for the U.S. Appl. No. 17/680,346, Jan. 8, 2024.

Office Action issued by the U.S. Patent and Trademark Office for the U.S. Appl. No. 17/680,346, Apr. 3, 2024.

Office Action with Form PTO-892 Notice of References Cited issued by the U.S. Patent and Trademark Office for the U.S. Appl. No. 17/680,346, May 2, 2024.

Office Action with Form PTO-892 Notice of References Cited issued by the U.S. Patent and Trademark Office for the U.S. Appl. No. 17/680,346, Aug. 2, 2024.

* cited by examiner

OPERATING DEVICE FOR HUMAN-POWERED VEHICLE

CROSS-REFERENCE TO RELATED APPLICATIONS

The present application is a continuation application of the U.S. patent application Ser. No. 17/680,346 filed Feb. 25, 2022. The contents of the U.S. patent application Ser. No. 17/680,346 are incorporated herein by reference in their entirety.

BACKGROUND

Technical Field

The present invention relates to an operating device for a human-powered vehicle.

Background Information

A human-powered vehicle includes an operating unit to operate an additional unit. The operating unit is contactable with a user's hand. It is preferable that the shape of the operating unit fits for the user's hand.

SUMMARY

In accordance with an aspect of the present invention, an operating device for a human-powered vehicle includes a base and an operating member. The base includes a first end part and a second end part. The second end part is configured to be coupled to a tubular part of the human-powered vehicle. The base extends between the first end part and the second end part in a longitudinal direction. The operating member is pivotally coupled to the base about a pivot axis. The base includes a base body and a cover configured to be attached to the base body to at least partially cover the base body. The cover includes a cover body and a buffering part. The cover body is configured to at least partially cover the base body. The buffering part is provided on an inner cover surface of the cover body. The cover body includes an upper outer surface, a first lateral outer surface, a second lateral outer surface, a first shoulder, and a second shoulder. The base body is provided between the first lateral outer surface and the second lateral outer surface in a cover attachment state where the cover is attached to the base body. The first shoulder is provided to the second end part and is provided between the upper outer surface and the first lateral outer surface. The first shoulder includes a first curved surface connecting the upper outer surface and the first lateral outer surface. The second shoulder is provided to the second end part and is provided between the upper outer surface and the second lateral outer surface. The second shoulder includes a second curved surface connecting the upper outer surface and the second lateral outer surface. The buffering part is in contact with the base body when the cover is deformed by force applied from a user's hand.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

1. FIG. 9 is a cross-sectional view of the operating device taken along line IX-IX of

FIG. 5.

DESCRIPTION OF THE EMBODIMENTS

Figure 1:
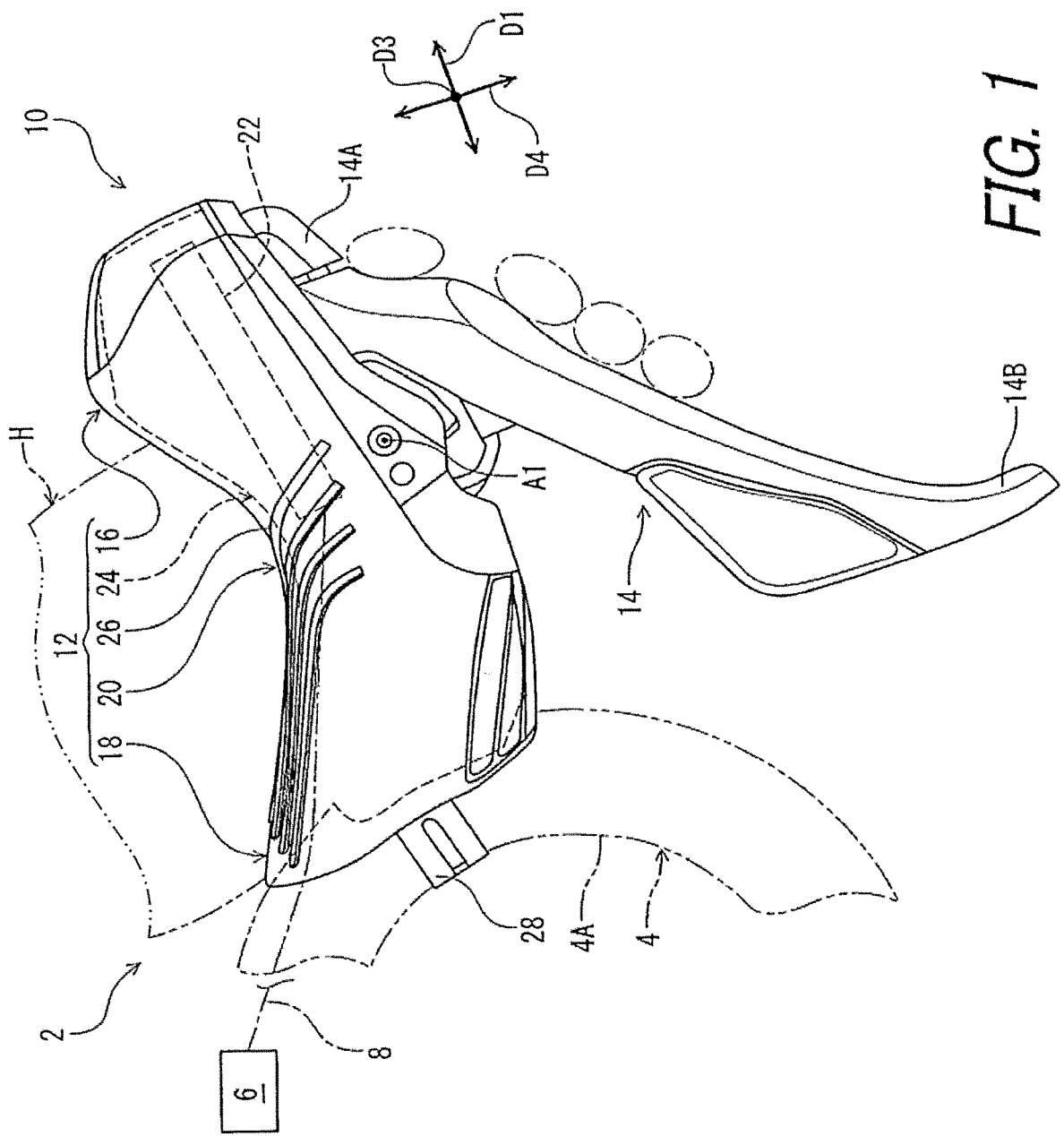
FIG. 1 is a side elevational view of an operating device in accordance with an embodiment.

The embodiment(s) will now be described with reference to the accompanying drawings, wherein like reference numerals designate corresponding or identical elements throughout the various drawings.

As seen in FIG. 1, an operating device 10 for a human-powered vehicle 2 comprises a base 12 and an operating member 14. The base 12 includes a first end part 16 and a second end part 18. The second end part 18 is configured to be coupled to a tubular part 4 of the human-powered vehicle 2. The base 12 extends between the first end part 16 and the second end part 18 in a longitudinal direction D1.

In the present embodiment, the base 12 includes a grip part 20 provided between the first end part 16 and the second end part 18. The grip part 20 is configured to be gripped by a user. The base 12 is contactable with the user's hand H. For example, the second end part 18 and the grip part 20 are contactable with the user's hand H. The shape of the grip part 20 is not limited to the illustrated embodiment. The grip part 20 can be omitted from the base 12 if needed and/or desired.

The operating member 14 is pivotally coupled to the base 12 about a pivot axis A1. In the present embodiment, the operating member 14 includes a proximal end part 14A and a distal end part 14B and extends between the proximal end part 14A and the distal end part 4B. The proximal end part 14A is pivotally coupled to the base 12 about the pivot axis A1. The proximal end part 14A is closer to the first end part 16 than the distal end part 14B. However, the structure of the operating member 14 is not limited to the illustrated embodiment.

The operating device 10 includes an operating structure 22. The operating structure 22 is operatively coupled to the operating member 14 to hydraulically, mechanically, or electrically operate a component 6 in response to a pivotal movement of the operating member 14. For example, the operating structure 22 is configured to be connected to the component 6 with a hydraulic hose 8. The operating structure 22 is operatively coupled to the operating member 14 to hydraulically operate the component 6 in response to the pivotal movement of the operating member 14. However, the operating structure 22 can be operatively coupled to the operating member 14 to mechanically or electrically operate the component 6 in response to the pivotal movement of the operating member 14 if needed and/or desired. The operating structure 22 can be configured to be connected to the component 6 with a connecting member such as the hydraulic hose 8, a mechanical cable, or an electrical cable. The operating structure 22 can be configured to wirelessly communicate with the component 6 in response to the pivotal movement of the operating member 14.

In the present application, a human-powered vehicle is a vehicle to travel with a motive power including at least a human power of a user who rides the human-powered vehicle (i.e., rider). The human-powered vehicle includes a various kind of bicycles such as a mountain bike, a road bike, a city bike, a cargo bike, a hand bike, and a recumbent bike. Furthermore, the human-powered vehicle includes an electric bike (E-bike). The electric bike includes an electrically assisted bicycle configured to assist propulsion of a vehicle with an electric motor. However, a total number of wheels of the human-powered vehicle is not limited to two. For example, the human-powered vehicle includes a vehicle having one wheel or three or more wheels. Especially, the human-powered vehicle does not include a vehicle that uses only an internal-combustion engine as motive power. Generally, a light road vehicle, which includes a vehicle that does not require a driver's license for a public road, is assumed as the human-powered vehicle.

In the present embodiment, the operating device 10 is a right-hand operating device configured to be operated by the user's right hand. However, the structure of the operating device 10 can be applied to a left-hand operating device configured to be operated by the user's left hand if needed and/or desired.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on a saddle or a seat) in the human-powered vehicle 2 with facing a handlebar or a steering. Accordingly, these terms, as utilized to describe the operating device 10 or other components, should be interpreted relative to the human-powered vehicle 2 equipped with the operating device 10 or other components as used in an upright riding position on a horizontal surface.

As seen in FIG. 1, the base 12 includes a base body 24 and a cover 26. The cover 26 is configured to be attached to the base body 24 to at least partially cover the base body 24. The base body 24 and the cover 26 constitute the first end part 16, the second end part 18, and the grip part 20. In the present embodiment, the cover 26 is configured to be attached to the base body 24 to partially cover the base body 24. The cover 26 is made of an elastic material. Examples of the elastic material include rubber. However, the cover 26 can be configured to be attached to the base body 24 to entirely cover the base body 24 if needed and/or desired. The cover 26 can be made of materials other than the elastic material if needed and/or desired.

The operating device 10 further comprises a coupling member 28. The coupling member 28 is provided at the second end part 18 to couple the second end part 18 and the tubular part 4. In the present embodiment, the coupling member 28 is configured to couple the second end part 18 and a drop-down handlebar 4A of the tubular part 4. However, the coupling member 28 can be configured to couple the second end part 18 and the tubular part 4 other than the drop-down handlebar 4A if needed and/or desired.

Figure 2:
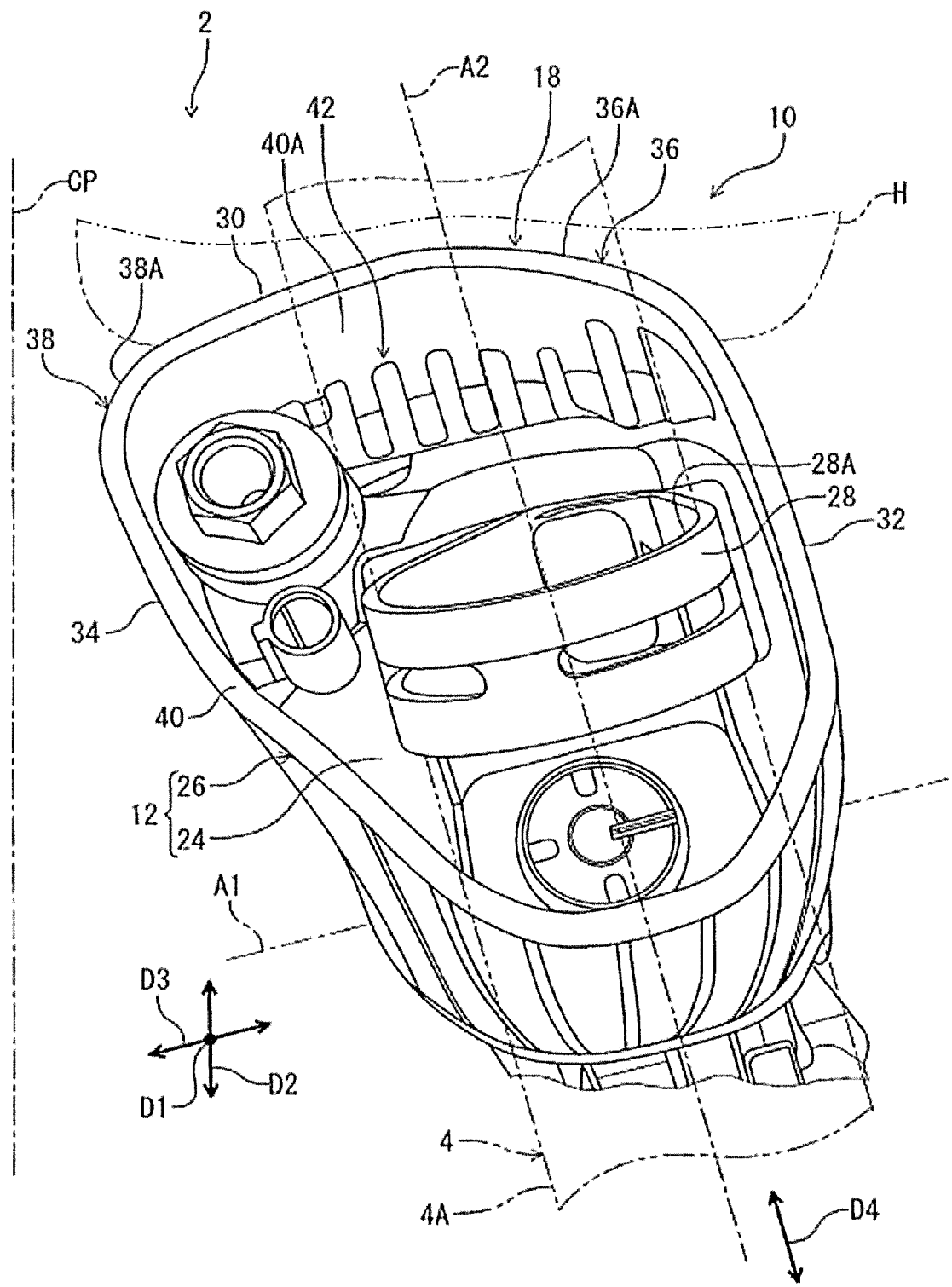
FIG. 2 is a rear view of the operating device illustrated in FIG. 1.

As seen in FIG. 2, the coupling member 28 includes a coupling opening 28A in which the tubular part 4 is to be provided. The coupling opening 28A has a center axis A2. The center axis A2 of the coupling opening 28A is inclined relative to a vertical direction D2 as viewed in the longitudinal direction D1 in a coupling state where the coupling member 28 couples the second end part 18 and the tubular part 4.

The cover 26 includes an upper outer surface 30, a first lateral outer surface 32, a second lateral outer surface 34, a first shoulder 36, and a second shoulder 38. The base body 24 is provided between the first lateral outer surface 32 and the second lateral outer surface 34 in a cover attachment state where the cover 26 is attached to the base body 24. The base body 24 is provided between the first lateral outer surface 32 and the second lateral outer surface 34 in the cover 26 attachment state in an axial direction D3 with respect to the pivot axis A1. The axial direction D3 is parallel to the pivot axis A1.

The upper outer surface 30 is configured to obliquely upwardly face in a state where the second end part 18 is coupled to the tubular part 4. The first lateral outer surface 32 is configured to obliquely upwardly face in the state where the second end part 18 is coupled to the tubular part 4. The second lateral outer surface 34 is configured to obliquely downwardly face in the state where the second end part 18 is coupled to the tubular part 4.

The second lateral outer surface 34 is provided between the first lateral outer surface 32 and a center plane CP of the human-powered vehicle 2 in a state where the second end part 18 is coupled to the tubular part 4 of the human-powered vehicle 2. The center plane CP is parallel to the vertical direction D2.

The first shoulder 36 is provided to the second end part 18. The first shoulder 36 is provided between the upper outer surface 30 and the first lateral outer surface 32. The first shoulder 36 includes a first curved surface 36A connecting the upper outer surface 30 and the first lateral outer surface 32. The first curved surface 36A includes a curved convex surface outwardly protruding away from the base body 24.

The second shoulder 38 is provided to the second end part 18. The second shoulder 38 is provided between the upper outer surface 30 and the second lateral outer surface 34. The second shoulder 38 includes a second curved surface 38A connecting the upper outer surface 30 and the second lateral outer surface 34. The second curved surface 38A includes a curved convex surface outwardly protruding away from the base body 24.

The first shoulder 36 is configured to receive the user's hand H in a state where the base 12 is gripped by the user's hand H. The first shoulder 36 is contactable with the user's hand H in the state where the base 12 is gripped by the user's hand H. The first curved surface 36A is contactable with the user's hand H in the state where the base 12 is gripped by the user's hand H. For example, the first shoulder 36 is configured to receive a palm of the user's hand H in the state where the base 12 is gripped by the user's hand H. The first shoulder 36 is configured to receive a carpal region (e.g., a little-finger side of the carpal region) of the user's hand H in the state where the base 12 is gripped by the user's hand H.

The cover 26 includes a cover body 40. The cover body 40 includes the upper outer surface 30, the first lateral outer surface 32, the second lateral outer surface 34, the first shoulder 36, and the second shoulder 38. The cover body 40 is configured to at least partially cover the base body 24. In the present embodiment, the cover body 40 is configured to partially cover the base body 24. However, the cover body 40 can be configured to entirely cover the base body 24 if needed and/or desired.

FIGS. 3 to 7 show different cross-sections CS1 to CS5 taken perpendicularly to the longitudinal direction D1. The different cross-sections CS1 to CS5 depicted in FIGS. 3 to 7 show only the base 12 (the base body 24 and the cover 26) for the sake of brevity. The different cross-sections CS1 to CS5 depicted in FIGS. 3 to 7 show a free state where the base 12 is not coupled to the tubular part 4A of the human-powered vehicle 2 and where the base 12 is not deformed by the tubular part 4A and by external force such as force applied by the user.

As seen in FIGS. 3 to 7, the first curved surface 36A is gentler than the second curved surface 38A as viewed in the longitudinal direction D1. The first curved surface 36A has at least one curvature radius defined in a first shoulder region SR1 in each of different cross-sections CS1 to CS5 taken perpendicularly to the longitudinal direction D1 in a longitudinal region LR (see e.g., FIG. 8).

The first shoulder region SR1 is defined between the first lateral outer surface 32 and a first reference plane RP11. The first reference plane RP11 is spaced apart from the first lateral outer surface 32 by 20 mm in the axial direction D3 with respect to the pivot axis A1. The first reference plane RP11 is perpendicular to the axial direction D3. A first additional reference plane RP12 is defined on the first lateral outer surface 32 and is perpendicular to the axial direction D3. The first shoulder region SR1 is defined between the first reference plane RP11 and the first additional reference plane RP12 in the axial direction D3.

The first shoulder region SR1 is defined between the upper outer surface 30 and a second reference plane RP21. The second reference plane RP21 is spaced apart from the upper outer surface 30 by 20 mm in a perpendicular direction D4 perpendicular to both the longitudinal direction D1 and the axial direction D3. The second reference plane RP21 is perpendicular to the perpendicular direction D4. A second additional reference plane RP22 is defined on the upper outer surface 30 and is perpendicular to the perpendicular direction D4. The second shoulder region SR2 is defined between the second reference plane RP21 and the second additional reference plane RP22 in the perpendicular direction D4.

Namely, the first shoulder region SR1 is a square region surrounded by the first reference plane RP11, the first additional reference plane RP12, the second reference plane RP21, and the second additional reference plane RP22 in each of the different cross-sections CS1 to CS5.

Figure 8:
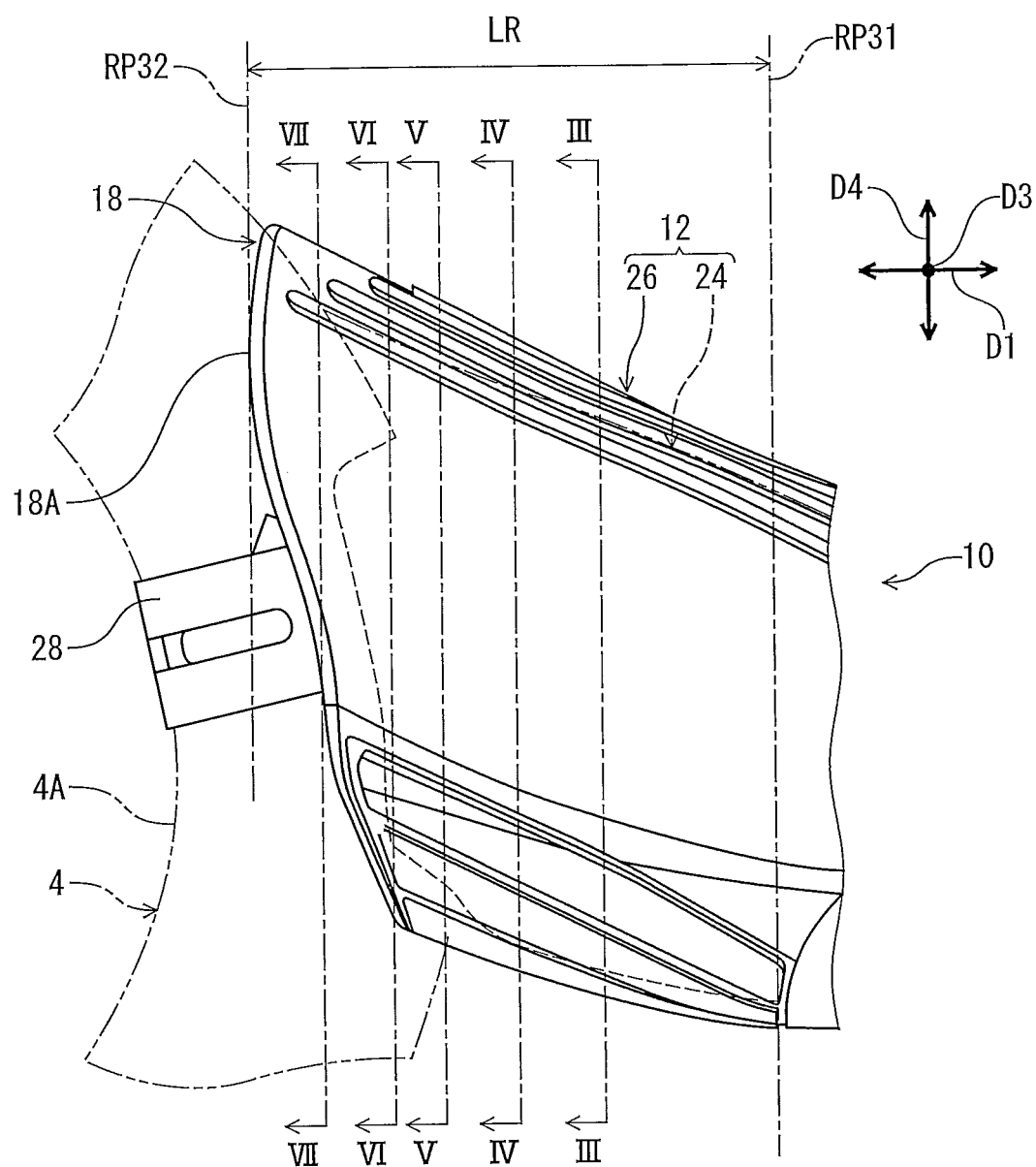
FIG. 8 is a partial side elevational view of the operating device illustrated in FIG.

As seen in FIG. 8, the longitudinal region LR is defined between an end surface 18A of the second end part 18 and a longitudinal reference plane RP31. The longitudinal reference plane RP31 is spaced apart from the end surface by 40 mm in the longitudinal direction D1. An additional longitudinal reference surface RP32 is defined on the end surface 18A of the second end part 18 and is perpendicular to the longitudinal direction D1. The longitudinal region LR is defined between the longitudinal reference plane RP31 and the additional longitudinal reference surface RP32 in the longitudinal direction D1. The cross-sections CS1 to CS5 are provided in the longitudinal region LR.

As seen in FIGS. 3 to 7, a maximum value of the at least one curvature radius defined in the first shoulder region SR1 in each of the different cross-sections CS1 to CS5 is smaller than 60 mm. The first curved surface 36A is gentler than the second curved surface 38A in each of the different cross-sections CS1 to CS5.

Figure 3:
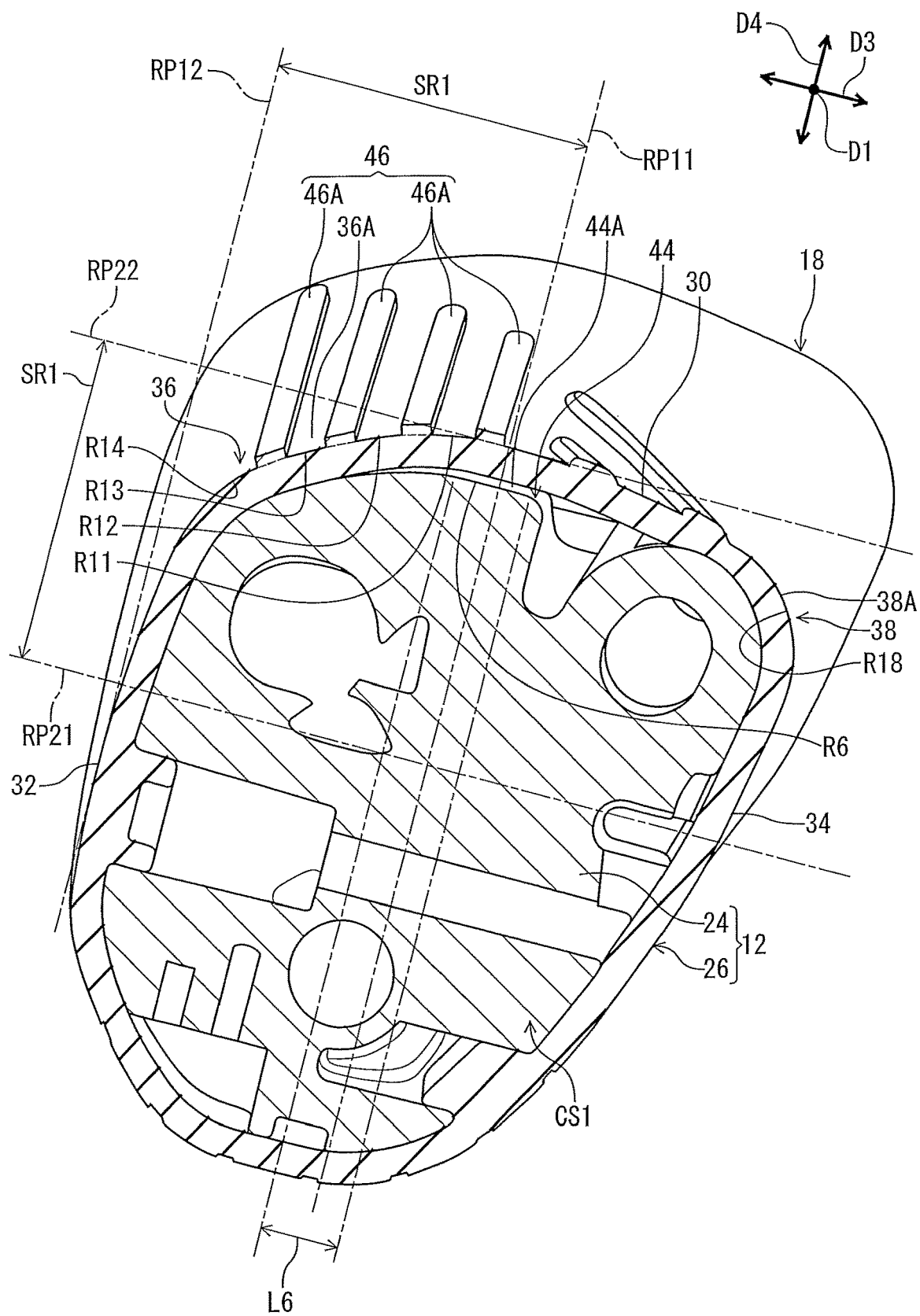
FIG. 3 is a cross-sectional view of the operating device taken along line III-III of FIG. 8.

As seen in FIG. 3, the first curved surface 36A has curvature radii R11, R12, R13, and R14 defined in the first shoulder region SR1 in the cross-section CS1. A maximum value (e.g., R12) of the curvature radii R11, R12, R13, and R14 defined in the first shoulder region SR1 in the cross-section CS1 is smaller than 60 mm. The maximum value (e.g., R12) of the curvature radii R11, R12, R13, and R14 defined in the first shoulder region SR1 in the cross-section CS1 is larger than 19 mm. However, the maximum value of the curvature radii R11, R12, R13, and R14 is not limited to the above range.

The second curved surface 38A has an additional curvature radius R18 defined in the cross-section CS1. The maximum value (e.g., R12) of the curvature radii R11, R12, R13, and R14 is larger than the additional curvature radius R18.

Figure 4:
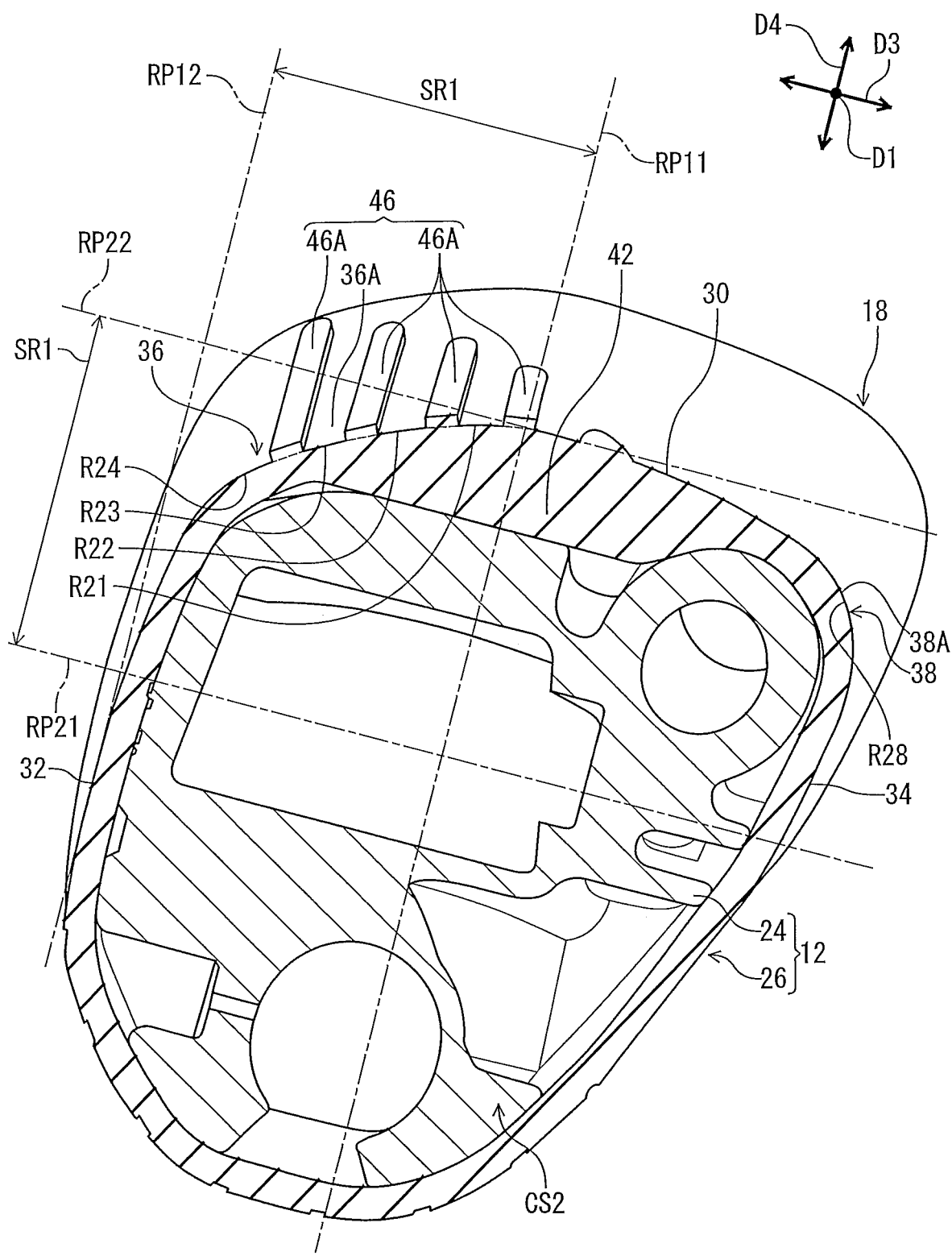
FIG. 4 is a cross-sectional view of the operating device taken along line IV-IV of FIG. 8.

As seen in FIG. 4, the first curved surface 36A has curvature radii R21, R22, R23, and R24 defined in the first shoulder region SR1 in the cross-section CS2. A maximum value (e.g., R22) of the curvature radii R21, R22, R23, and R24 defined in the first shoulder region SR1 in the cross-section CS2 is smaller than 60 mm. The maximum value (e.g., R22) of the curvature radii R21, R22, R23, and R24 defined in the first shoulder region SR1 in the cross-section CS2 is larger than 19 mm. However, the maximum value of the curvature radii R21, R22, R23, and R24 is not limited to the above range.

The second curved surface 38A has an additional curvature radius R28 defined in the cross-section CS2. The maximum value (e.g., R22) of the curvature radii R21, R22, R23, and R24 is larger than the additional curvature radius R28.

Figure 5:
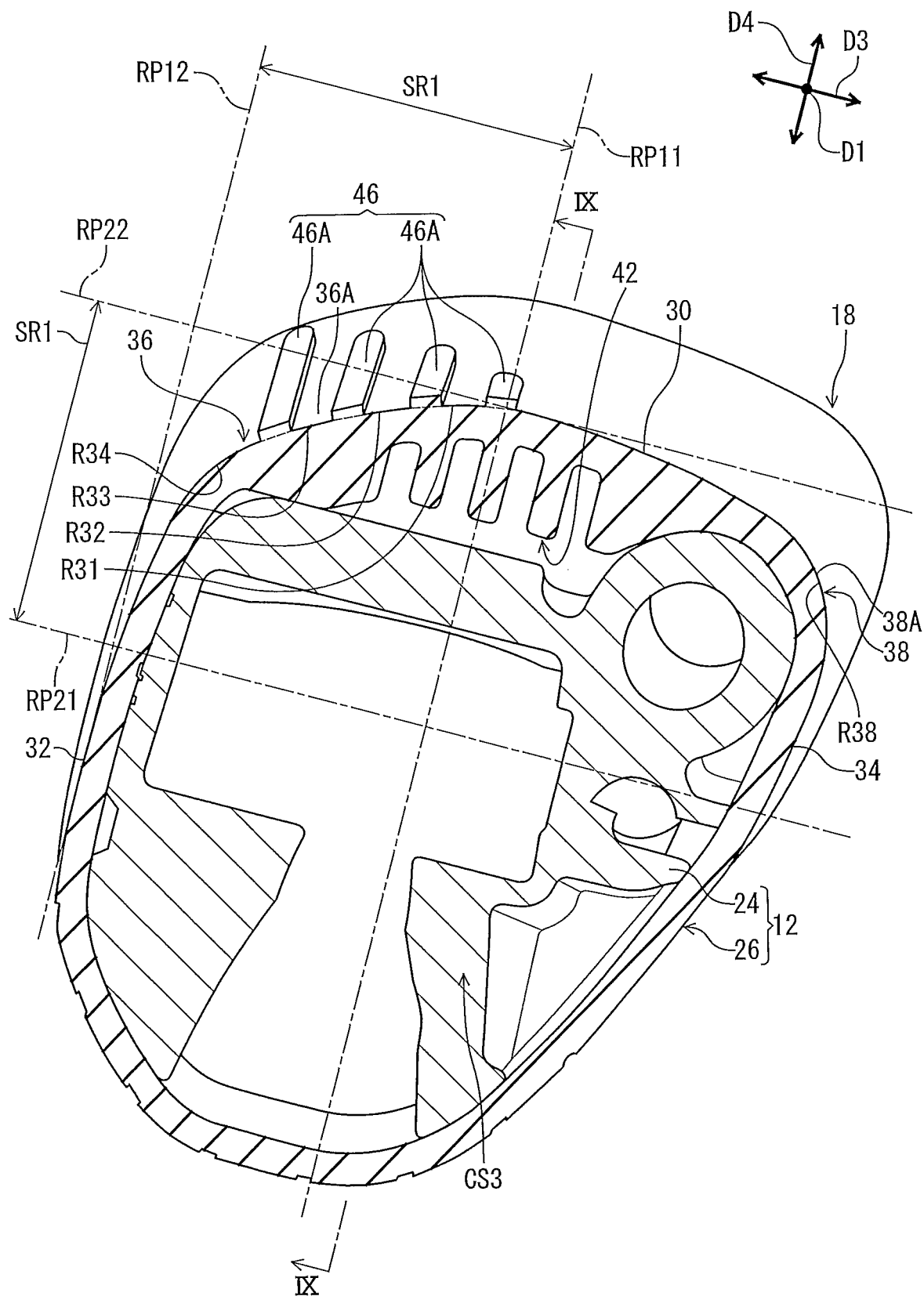
FIG. 5 is a cross-sectional view of the operating device taken along line V-V of FIG. 8.

As seen in FIG. 5, the first curved surface 36A has curvature radii R31, R32, R33, and R34 defined in the first shoulder region SR1 in the cross-section CS3. A maximum value (e.g., R32) of the curvature radii R31, R32, R33, and R34 defined in the first shoulder region SR1 in the cross-section CS3 is smaller than 60 mm. The maximum value (e.g., R32) of the curvature radii R31, R32, R33, and R34 defined in the first shoulder region SR1 in the cross-section CS3 is larger than 19 mm. However, the maximum value of the curvature radii R31, R32, R33, and R34 is not limited to the above range.

The second curved surface 38A has an additional curvature radius R38 defined in the cross-section CS3. The maximum value (e.g., R32) of the curvature radii R31, R32, R33, and R34 is larger than the additional curvature radius R38.

Figure 6:
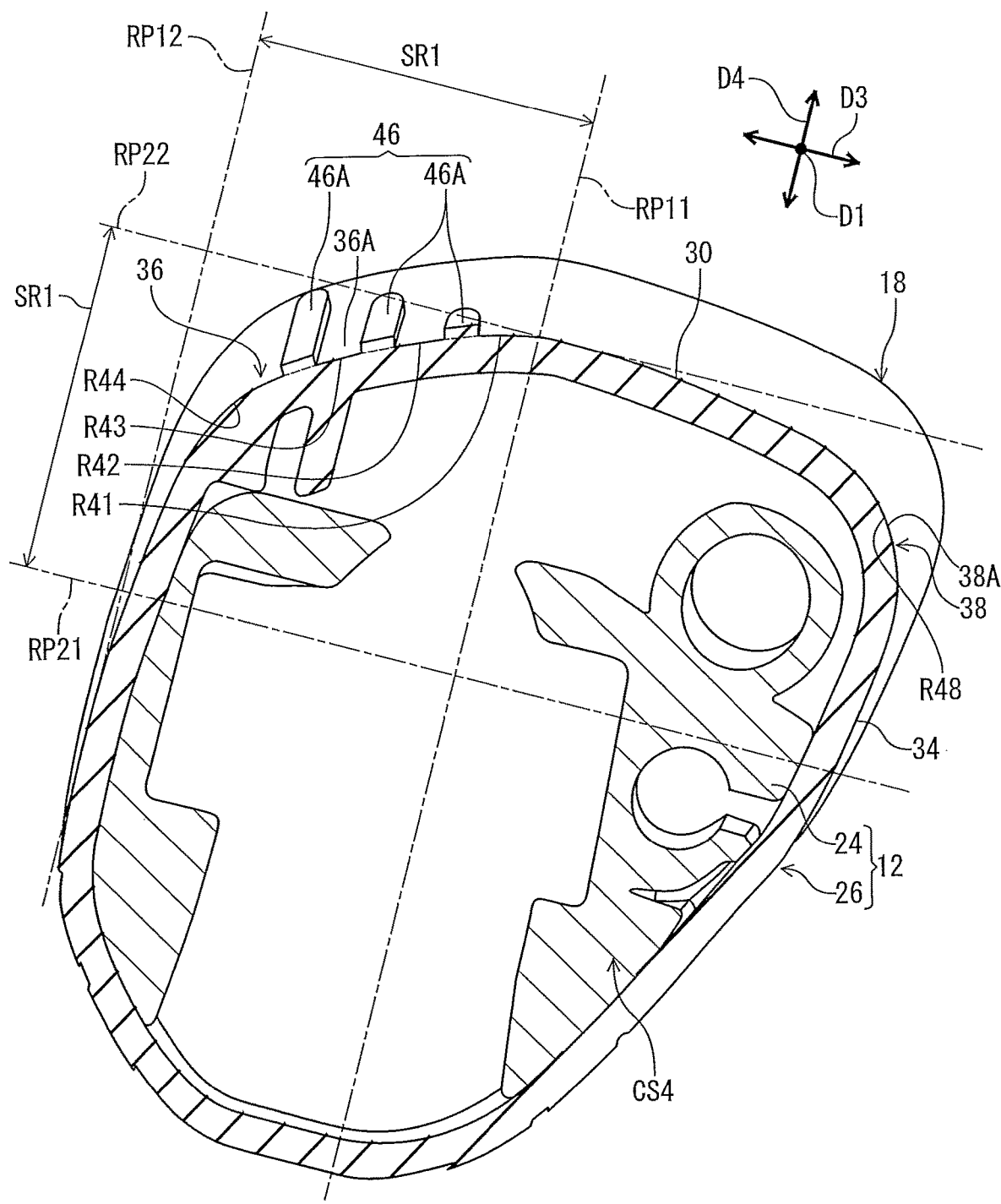
FIG. 6 is a cross-sectional view of the operating device taken along line VI-VI of FIG. 8.

As seen in FIG. 6, the first curved surface 36A has curvature radii R41, R42, R43, and R44 defined in the first shoulder region SR1 in the cross-section CS4. A maximum value (e.g., R42) of the curvature radii R41, R42, R43, and R44 defined in the first shoulder region SR1 in the cross-section CS4 is smaller than 60 mm. The maximum value (e.g., R42) of the curvature radii R41, R42, R43, and R44 defined in the first shoulder region SR1 in the cross-section CS4 is larger than 19 mm. However, the maximum value of the curvature radii R41, R42, R43, and R44 is not limited to the above range.

The second curved surface 38A has an additional curvature radius R48 defined in the cross-section CS4. The maximum value (e.g., R42) of the curvature radii R41, R42, R43, and R44 is larger than the additional curvature radius R48.

Figure 7:
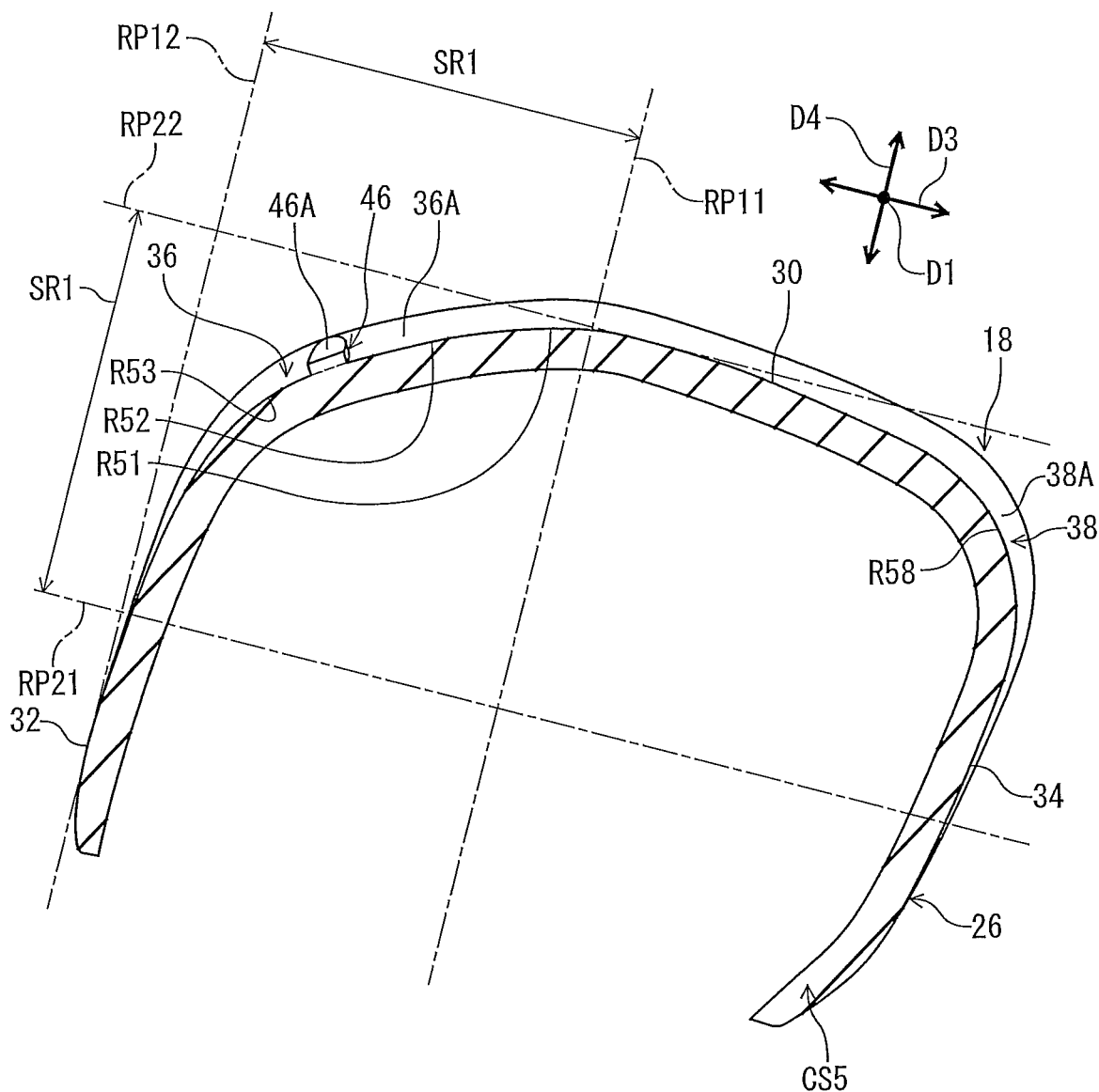
FIG. 7 is a cross-sectional view of the operating device taken along line VII-VII of FIG. 8.

As seen in FIG. 7, the first curved surface 36A has curvature radii R51, R52, and R53 defined in the first shoulder region SR1 in the cross-section CS5. A maximum value (e.g., R52) of the curvature radii R51, R52, and R53 defined in the first shoulder region SR1 in the cross-section CS5 is smaller than 60 mm. The maximum value (e.g., R52) of the curvature radii R51, R52, and R53 defined in the first shoulder region SR1 in the cross-section CS5 is larger than 19 mm. However, the maximum value of the curvature radii R51, R52, and R53 is not limited to the above range.

The second curved surface 38A has an additional curvature radius R58 defined in the cross-section CS5. The maximum value (e.g., R52) of the curvature radii R51, R52, R53, and R54 is larger than the additional curvature radius R58.

Figure 9:
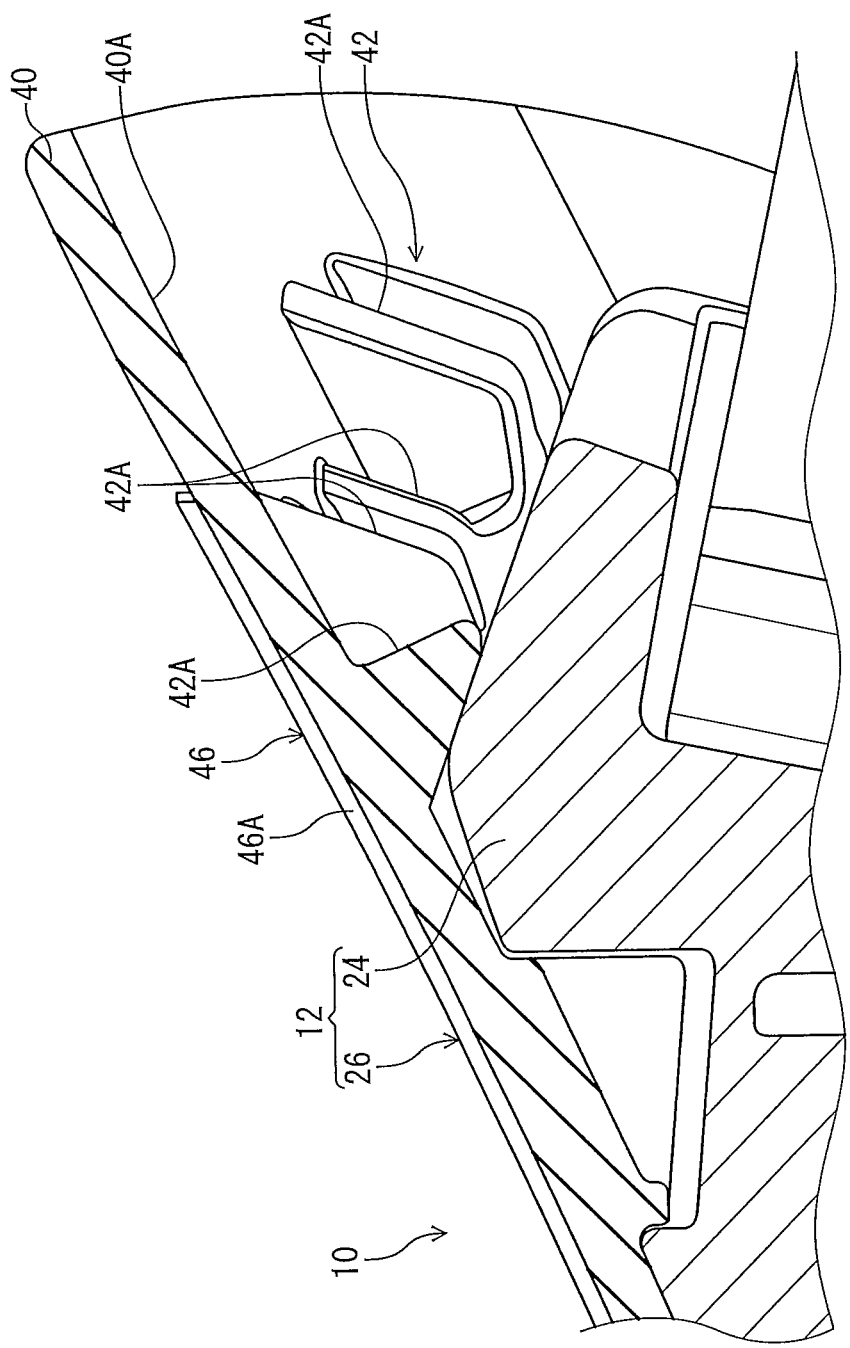

As seen in FIG. 9, the cover 26 includes a buffering part 42. The buffering part 42 is provided between the base body 24 and the cover body 40. The cover body 40 includes an inner cover surface 40A. The buffering part 42 is provided on the inner cover surface 40A of the cover body 40. The buffering part 42 protrudes from the inner cover surface 40A of the cover body 40.

In the present embodiment, the buffering part 42 is integrally provided with the cover body 40 as a one-piece unitary member. However, the buffering part 42 can at least partially be a separate member from the cover body 40 if needed and/or desired. In such an embodiment, for example, the buffering part 42 is attached to the cover body 40 with an attachment structure such as an adhesive agent or press-fitting.

As seen in FIG. 5, the buffering part 42 extends from the first shoulder 36 to the first reference plane RP11 spaced apart from the first lateral outer surface 32 by 20 mm in an axial direction D3 with respect to the pivot axis A1. The buffering part 42 extends from the first shoulder 36 toward the second shoulder 38 through the first reference plane RP11 in the axial direction D3. However, the length of the buffering part 42 is not limited to the illustrated embodiment.

The buffering part 42 is at least partially spaced apart from the base body 24 in the free state. The buffering part 42 is partially spaced apart from the base body 24 in the free state. However, the buffering part 42 can be entirely spaced apart from the upper surface 44 in the free state.

The cover 26 is deformable by force applied from the user's hand H. The buffering part 42 is in contact with the base body 24 when the cover 26 is deformed by the force applied from the user's hand H. The buffering part 42 is further deformed by the force applied from the user's hand H after the buffering part 42 contacts the base body 24.

Figure 10:
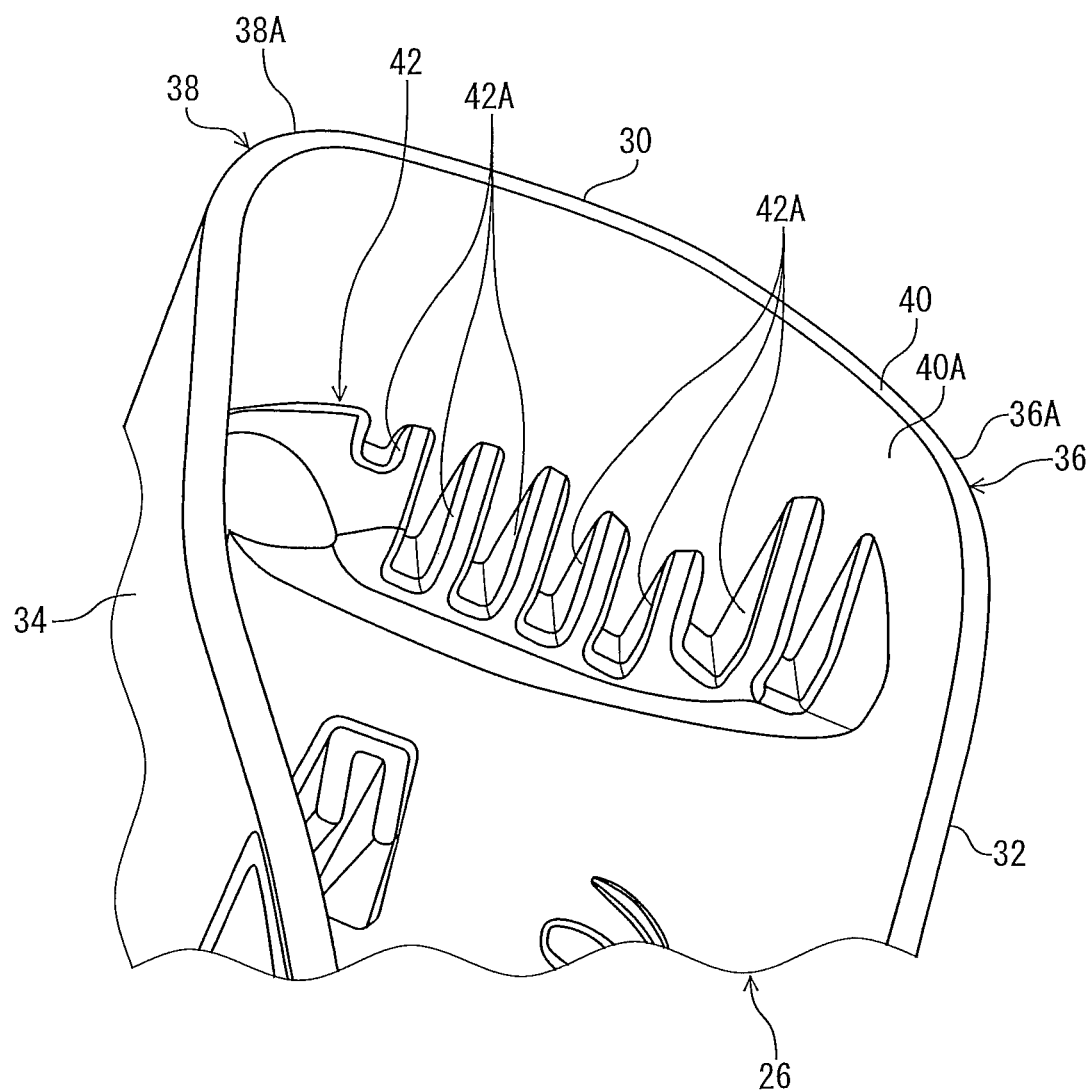
FIG. 10 is a perspective view of a cover the operating device illustrated in FIG. 1.

As seen in FIG. 10, the buffering part 42 includes at least one recess 42A configured to improve flexibility of the buffering part 42. In the present embodiment, the buffering part 42 includes a plurality of recesses 42A configured to improve flexibility of the buffering part 42. However, the total number of the recesses 42A is not limited to the illustrated embodiment. The recess 42A can be omitted from the buffering part 42 if needed and/or desired. The buffering part 42 can be omitted from the cover 26 if needed and/or desired.

As seen in FIG. 3, the base body 24 includes an upper surface 44 configured to be at least partially covered by the cover 26. The upper surface 44 includes a curved surface 44A. The curved surface 44A is provided between the upper outer surface 30 and the base body 24 in the cover 26 attachment state.

In the present embodiment, the curved surface 44A has a curvature radius R6 larger than 50 mm as viewed in the longitudinal direction D1. The curved surface 44A has a length L6 shorter than 7 mm as viewed in the longitudinal direction D1. The curvature radius R6 is smaller than 90 mm. The length L6 is longer than 5 mm. The curved surface 44A has the curvature radius R6 and the length L6 in the cross-section CS1. However, the curvature radius R6 of the curved surface 44A is not limited to the above range. The length L6 of the curved surface 44A is not limited to the above range. The curved surface 44A can have the curvature radius R6 and the length L6 in cross-sections other than the cross-section CS1.

In the present embodiment, the first reference plane RP11 is defined in an axial range of the curved surface 44A defined in the axial direction D3. However, the first reference plane RP11 can be defined outside the axial range of the curved surface 44A if needed and/or desired.

As seen in FIGS. 3 to 7, the cover 26 includes a protruding body 46. The protruding body 46 protrudes from the first curved surface 36A of the first shoulder 36. The protruding body 46 protrudes from the first curved surface 36A of the first shoulder 36 away from the base body 24. The protruding body 46 outwardly protrudes from the cover body 40 away from the base body 24.

The protruding body 46 includes a plurality of protruding parts 46A protruding from the first curved surface 36A of the first shoulder 36. The plurality of protruding parts 46A is spaced apart from each other. The plurality of protruding parts 46A outwardly protrudes from the cover body 40 away from the base body 24.

In the present embodiment, the protruding body 46 is integrally provided with the cover body 40 as a one-piece unitary member. However, the protruding body 46 can at least partially be a separate member from the cover body 40 if needed and/or desired. In such an embodiment, for example, the protruding body 46 is attached to the cover body 40 with an attachment structure such as an adhesive agent or press-fitting.

Figure 11:
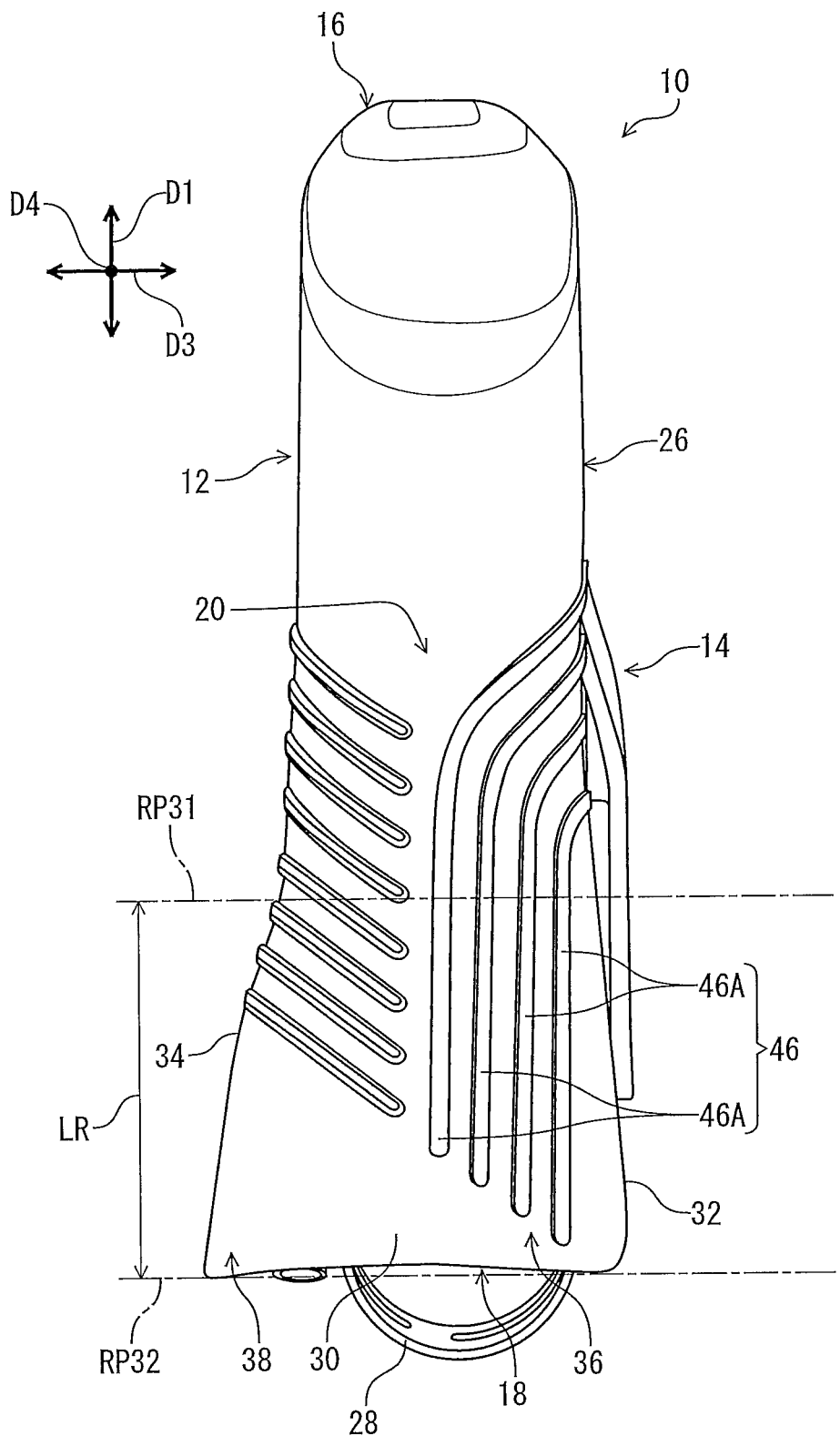
FIG. 11 is a top view of the operating device illustrated in FIG. 1.

As seen in FIG. 11, the protruding body 46 at least partially extends along the longitudinal direction D1. The plurality of protruding parts 46A at least partially extends along the longitudinal direction D1. The protruding body 46 partially extends along the longitudinal direction D1. The plurality of protruding parts 46A partially extends along the longitudinal direction D1. The protruding body 46 extends toward the additional longitudinal reference plane RP32 through the longitudinal reference plane RP31. The plurality of protruding parts 46A extends toward the additional longitudinal reference plane RP32 through the longitudinal reference plane RP31. However, the protruding body 46 can have shapes other than the illustrated embodiment if needed and/or desired. The plurality of protruding parts 46A can have shapes other than the illustrated embodiment if needed and/or desired. The protruding body 46 can be omitted from the cover 26 if needed and/or desired.

In accordance with a first aspect of the embodiments, an operating device for a human-powered vehicle comprises a base and an operating member. The base includes a first end part and a second end part. The second end part is configured to be coupled to a tubular part of the human-powered vehicle. The base extends between the first end part and the second end part in a longitudinal direction. The operating member is pivotally coupled to the base about a pivot axis. The base includes a base body and a cover configured to be attached to the base body to at least partially cover the base body. The cover includes an upper outer surface, a first lateral outer surface, a second lateral outer surface, a first shoulder, and a second shoulder. The base body is provided between the first lateral outer surface and the second lateral outer surface in a cover attachment state where the cover is attached to the base body. The first shoulder is provided to the second end part and is provided between the upper outer surface and the first lateral outer surface. The first shoulder includes a first curved surface connecting the upper outer surface and the first lateral outer surface. The second shoulder is provided to the second end part and is provided between the upper outer surface and the second lateral outer surface. The second shoulder includes a second curved surface connecting the upper outer surface and the second lateral outer surface. The first curved surface is gentler than the second curved surface as viewed in the longitudinal direction.

With the operating device according to the first aspect, the first curved surface of the first shoulder can give the user's hand a better fit for the base.

In accordance with a second aspect of the embodiments, an operating device for a human-powered vehicle comprises a base and an operating member. The base includes a first end part and a second end part. The second end part is configured to be coupled to a tubular part of the human-powered vehicle. The base extends between the first end part and the second end part in a longitudinal direction. The operating member is pivotally coupled to the base about a pivot axis. The base includes a base body and a cover configured to be attached to the base body to at least partially cover the base body. The cover includes an upper outer surface, a first lateral outer surface, a second lateral outer surface, a first shoulder, and a second shoulder. The base body is provided between the first lateral outer surface and the second lateral outer surface in a cover attachment state where the cover is attached to the base body. The first shoulder is provided to the second end part and is provided between the upper outer surface and the first lateral outer surface. The first shoulder includes a first curved surface connecting the upper outer surface and the first lateral outer surface. The second shoulder is provided to the second end part and is provided between the upper outer surface and the second lateral outer surface. The second shoulder includes a second curved surface connecting the upper outer surface and the second lateral outer surface. The first curved surface has at least one curvature radius defined in a first shoulder region in each of different cross-sections taken perpendicularly to the longitudinal direction in a longitudinal region. The first shoulder region is defined between the first lateral outer surface and a first reference plane spaced apart from the first lateral outer surface by 20 mm in an axial direction with respect to the pivot axis. The first shoulder region is defined between the upper outer surface and a second reference plane spaced apart from the upper outer surface by 20 mm in a perpendicular direction perpendicular to both the longitudinal direction and the axial direction. The longitudinal region is defined between an end surface of the second end part and a longitudinal reference plane spaced apart from the end surface by 40 mm in the longitudinal direction. A maximum value of the at least one curvature radius defined in the first shoulder region in each of the different cross-sections is smaller than 60 mm.

With the operating device according to the second aspect, the first curved surface of the first shoulder can give the user's hand a better fit for the base.

In accordance with a third aspect of the embodiments, an operating device for a human-powered vehicle comprises a base and an operating member. The base includes a first end part and a second end part. The second end part is configured to be coupled to a tubular part of the human-powered vehicle. The base extends between the first end part and the second end part in a longitudinal direction. The operating member is pivotally coupled to the base about a pivot axis. The base includes a base body and a cover configured to be attached to the base body to at least partially cover the base body. The cover includes a cover body and a buffering part. The cover body is configured to at least partially cover the base body. The buffering part is provided between the base body and the cover body. The cover body includes an upper outer surface, a first lateral outer surface, a second lateral outer surface, a first shoulder, and a second shoulder. The base body is provided between the first lateral outer surface and the second lateral outer surface in a cover attachment state where the cover is attached to the base body. The first shoulder is provided to the second end part and is provided between the upper outer surface and the first lateral outer surface. The first shoulder includes a first curved surface connecting the upper outer surface and the first lateral outer surface. The second shoulder is provided to the second end part and is provided between the upper outer surface and the second lateral outer surface. The second shoulder includes a second curved surface connecting the upper outer surface and the second lateral outer surface. The buffering part extends from the first shoulder to a first reference plane spaced apart from the first lateral outer surface by 20 mm in an axial direction with respect to the pivot axis.

With the operating device according to the third aspect, the buffering part of the cover can give the user's hand a better fit for the base.

In accordance with a fourth aspect of the embodiments, the operating device according to the third aspect is configured so that the buffering part extends from the first shoulder toward the second shoulder through the first reference plane in the axial direction.

With the operating device according to the fourth aspect, the buffering part of the cover can reliably give the user's hand a better fit for the base.

In accordance with a fifth aspect of the embodiments, the operating device according to the third or fourth aspect is configured so that the buffering part includes at least one recess configured to improve flexibility of the buffering part.

With the operating device according to the fifth aspect, the at least one recess of the buffering part can reliably give the user's hand a better fit for the base.

In accordance with a sixth aspect of the embodiments, an operating device for a human-powered vehicle comprises a base and an operating member. The base includes a first end part and a second end part. The second end part is configured to be coupled to a tubular part of the human-powered vehicle. The base extends between the first end part and the second end part in a longitudinal direction. The operating member is pivotally coupled to the base about a pivot axis. The base includes a base body and a cover configured to be attached to the base body to at least partially cover the base body. The base body includes an upper surface configured to be at least partially covered by the cover. The upper surface includes a curved surface having a curvature radius larger than 50 mm as viewed in the longitudinal direction. The curved surface has a length shorter than 7 mm as viewed in the longitudinal direction.

With the operating device according to the sixth aspect, the upper surface of the base body can give the user's hand a better fit for the cover of the base.

In accordance with a seventh aspect of the embodiments, the operating device according to the sixth aspect is configured so that the cover includes an upper outer surface, a first lateral outer surface, a second lateral outer surface, a first shoulder, and a second shoulder. The base body is provided between the first lateral outer surface and the second lateral outer surface in a cover attachment state where the cover is attached to the base body. The first shoulder is provided to the second end part and is provided between the upper outer surface and the first lateral outer surface. The first shoulder includes a first curved surface connecting the upper outer surface and the first lateral outer surface. The second shoulder is provided to the second end part and is provided between the upper outer surface and the second lateral outer surface. The second shoulder includes a second curved surface connecting the upper outer surface and the second lateral outer surface. The curved surface is provided between the upper outer surface and the base body in the cover attachment state.

With the operating device according to the seventh aspect, the upper surface of the base body can reliably give the user's hand a better fit for the cover of the base.

In accordance with an eighth aspect of the embodiments, the operating device according to any one of the first to fifth and seventh aspects is configured so that the cover includes a cover body and a protruding body. The cover body is configured to at least partially cover the base body. The cover body includes the upper outer surface, the first lateral outer surface, the second lateral outer surface, the first shoulder, and the second shoulder. The protruding body protrudes from the first curved surface of the first shoulder.

With the operating device according to the eighth aspect, the protruding body of the cover can give the user's hand better slip resistance when the base is gripped by the user's hand.

In accordance with a ninth aspect of the embodiments, the operating device according to the eighth aspect is configured so that the protruding body includes a plurality of protruding parts protruding from the first curved surface of the first shoulder, the plurality of protruding parts being spaced apart from each other.

With the operating device according to the ninth aspect, the plurality of protruding parts of the cover can reliably give the user's hand better slip resistance when the base is gripped by the user's hand.

In accordance with a tenth aspect of the embodiments, the operating device according to the eighth or ninth aspect is configured so that the protruding body is integrally provided with the cover body as a one-piece unitary member.

With the operating device according to the tenth aspect, it is possible to simplify the structure of the cover while giving the user's hand better slip resistance when the base is gripped by the user's hand.

In accordance with an eleventh aspect of the embodiments, the operating device according to any one of the first to tenth aspects is configured so that the cover is made of an elastic material.

With the operating device according to the eleventh aspect, the elastic material can make the cover deformable depending on at least one of the shape of the base body and the force applied from the user's hand.

In accordance with a twelfth aspect of the embodiments, the operating device according to any one of the first to fifth and seventh to eleventh aspects is configured so that the first shoulder is configured to receive a user's hand in a state where the base is gripped by the user's hand.

With the operating device according to the twelfth aspect, the first curved surface of the first shoulder can give the user's hand a better fit for the base.

In accordance with a thirteenth aspect of the embodiments, the operating device according to any one of the first to twelfth aspects is configured so that the operating member includes a proximal end part and a distal end part and extends between the proximal end part and the distal end part. The proximal end part is pivotally coupled to the base about the pivot axis. The proximal end part is closer to the first end part than the distal end part.

With the operating device according to the thirteenth aspect, the positional relationship between the proximal end part, the distal end part, and the base can improve operability of the operating member while the first curved surface can give the user's hand a better fit for the base.

In accordance with a fourteenth aspect of the embodiments, the operating device according to any one of the first to thirteenth aspects is configured so that the second lateral outer surface is provided between the first lateral outer surface and a center plane of the human-powered vehicle in a state where the second end part is coupled to the tubular part of the human-powered vehicle.

With the operating device according to the fourteenth aspect, the first curved surface of the first shoulder can reliably give the user's hand a better fit for the base.

In accordance with a fifteenth aspect of the embodiments, the operating device according to any one of the first to fourteenth aspects further comprises a coupling member provided at the second end part to couple the second end part and the tubular part.

With the operating device according to the fifteenth aspect, it is possible to reliably couple the second end part of the base to the tubular part of the human-powered vehicle. Thus, it is possible to make the position of the base and the user's hand stable relative to the tubular part.

In accordance with a sixteenth aspect of the embodiments, the operating device according to the fifteenth aspect is configured so that the coupling member includes a coupling opening in which the tubular part is to be provided, the coupling opening having a center axis. The center axis of the coupling opening is inclined relative to a vertical direction as viewed in the longitudinal direction in a coupling state where the coupling member couples the second end part and the tubular part.

With the operating device according to the sixteenth aspect, it is possible to apply the operating device to a flare handlebar, for example.

In accordance with a seventeenth aspect of the embodiments, the operating device according to the fifteenth or sixteenth aspect is configured so that the coupling member is configured to couple the second end part and a drop-down handlebar of the tubular part.

With the operating device according to the seventeenth aspect, it is possible to apply the operating device to the drop-down handlebar.

In accordance with an eighteenth aspect of the embodiments, the operating device according to any one of the first to seventeenth aspects is configured so that the first lateral outer surface is configured to obliquely upwardly face in a state where the second end part is coupled to the tubular part.

With the operating device according to the eighteenth aspect, the first lateral outer surface can reliably give the user's hand a better fit for the base.

In accordance with a nineteenth aspect of the embodiments, the operating device according to any one of the first to eighteenth aspects is configured so that the base includes a grip part provided between the first end part and the second end part.

With the operating device according to the nineteenth aspect, it is possible to apply the structure of the operating device to an operating device for a road bike and a gravel bike.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. An operating device for a human-powered vehicle, the operating device comprising:
   a base including a first end part and a second end part, the second end part being configured to be coupled to a tubular part of the human-powered vehicle, the base extending between the first end part and the second end part in a longitudinal direction; and
   an operating member pivotally coupled to the base about a pivot axis,
   the base including a base body and a cover configured to be attached to the base body to at least partially cover the base body,
   the cover including
      a cover body configured to at least partially cover the base body, and
      a buffering part provided on an inner cover surface of the cover body,
   the cover body including
      an upper outer surface,
      a first lateral outer surface,
      a second lateral outer surface, the base body being provided between the first lateral outer surface and the second lateral outer surface in a cover attachment state where the cover is attached to the base body,
      a first shoulder provided to the second end part and provided between the upper outer surface and the first lateral outer surface, the first shoulder including a first curved surface connecting the upper outer surface and the first lateral outer surface, and
      a second shoulder provided to the second end part and provided between the upper outer surface and the second lateral outer surface, the second shoulder including a second curved surface connecting the upper outer surface and the second lateral outer surface,
   the buffering part being in contact with the base body when the cover is deformed by force applied from a user's hand,
   the buffering part is at least partially spaced apart from the base body in the free state, and
   the buffering part extends from the first shoulder.

2. The operating device according to claim 1, wherein the buffering part include at least one recess configured to improve flexibility of the buffering part.

3. The operating device according to claim 1, wherein the buffering part is provided between the first shoulder and a first reference plane spaced apart from the first lateral outer surface by 20 mm in an axial direction with respect to the pivot axis.

4. The operating device according to claim 3, wherein the buffering part extends from the first shoulder to the first reference plane.

5. The operating device according to claim 1, wherein the cover includes
   a cover body configured to at least partially cover the base body, the cover body including the upper outer surface, the first lateral outer surface, the second lateral outer surface, the first shoulder, and the second shoulder, and
   a protruding body protruding from the first curved surface of the first shoulder.

6. The operating device according to claim 5, wherein the protruding body includes a plurality of protruding parts protruding from the first curved surface of the first shoulder, the plurality of protruding parts being spaced apart from each other.

7. The operating device according to claim 5, wherein the protruding body is integrally provided with the cover body as a one-piece unitary member.

8. The operating device according to claim 1, wherein the cover is made of an elastic material.

9. The operating device according to claim 1, wherein the first shoulder is configured to receive the user's hand in a state where the base is gripped by the user's hand.

10. The operating device according to claim 1, wherein
the operating member includes a proximal end part and a distal end part and extends between the proximal end part and the distal end part,
the proximal end part is pivotally coupled to the base about the pivot axis, and
the proximal end part is closer to the first end part than the distal end part.

11. The operating device according to claim 1, wherein
the second lateral outer surface is provided between the first lateral outer surface and a center plane of the human-powered vehicle in a state where the second end part is coupled to the tubular part of the human-powered vehicle.

12. The operating device according to claim 1, further comprising
a coupling member provided at the second end part to couple the second end part and the tubular part.

13. The operating device according to claim 12, wherein
the coupling member includes a coupling opening in which the tubular part is to be provided, the coupling opening having a center axis, and
the center axis of the coupling opening is inclined relative to a vertical direction as viewed in the longitudinal direction in a coupling state where the coupling member couples the second end part and the tubular part.

14. The operating device according to claim 12, wherein
the coupling member is configured to couple the second end part and a drop-down handlebar of the tubular part.

15. The operating device according to claim 1, wherein
the first lateral outer surface is configured to obliquely upwardly face in a state where the second end part is coupled to the tubular part.

16. The operating device according to claim 1, wherein
the base includes a grip part provided between the first end part and the second end part.

* * * * *